United States Patent

[11] 3,617,244

[72] Inventors Philip Penry Jones;
 Alexander William Davidson, both of London, England
[21] Appl. No. 808,668
[22] Filed Mar. 19, 1969
[45] Patented Nov. 2, 1971
[73] Assignee BDH Chemicals Limited

[54] MICROBIOCIDAL COMPOSITIONS
 1 Claim, No Drawings
[52] U.S. Cl. .................................................... 71/67,
 424/23, 424/127, 424/347, 71/DIG. 1
[51] Int. Cl. ........................................................ A01n 9/00
[50] Field of Search ............................................ 71/67, 68,
 124, DIG. 1; 424/127, 22, 23, 349, 354, 347, 24

[56] References Cited
UNITED STATES PATENTS
2,637,536 5/1953 De Ment ........................ 71/DIG. 1
3,300,373 1/1967 Wolfson ........................ 424/349
FOREIGN PATENTS
589,926 12/1959 Canada ........................ 71/DIG. 1
OTHER REFERENCES Hueck et al., Applied Microbiology, Vol. 14, No. 3, 1966, pp. 308 to 319 (pp. 308–311 particularly relied upon)

Martin, Guide to Chemicals Used in Crop Protection, 3rd Ed. 1957, Canadian Dept. of Agriculture, pg. 103

Primary Examiner—James O. Thomas, Jr.
Attorney—Bacon & Thomas

ABSTRACT: Microbiocidal compositions comprising solid dichlorophen, sodium carbonate and a sodium silicate, and their use in aqueous systems.

MICROBIOCIDAL COMPOSITIONS

This invention relates to improvements in methods for reducing the formation of bacteria, algae and fungi in water systems.

It has been known for many years that dichlorophen is an excellent algicide, bactericide and fungicide.

It is widely used as a microbicide in recirculatory cooling systems in which water is the sole, or one, of the components. Such cooling systems, may employ heat exchangers (condensers) or refrigerants, or direct cooling by the water or water mixture, as in the case of grinding, cutting or rolling operations in the engineering industries. The use of oil-water emulsions as a coolant in these operations presents a microbial control problem of considerable difficulty.

A further problem is the presence of water in storage vessels containing hydrocarbons, such as oil fuel, petrol, kerosene or paraffin. Large microbiological populations may develop in the storage tanks, particularly at the interface between the hydrocarbon and the "water bottom." Also, because of lack of oxygen, anaerobic bacteria can thrive in the water layer and these can lead to the production of corrosive waste products which damage the container.

Dichlorophen (2,2'-dihydroxy-5, 5'-dichlorodiphenyldimethane) has a low solubility in water, i.e., 30 p.p.m. and the saturated solution is not lethal to many bacteria and fungi. In order to obtain the microbicidal effect, it has been necessary to employ a more soluble form of the compound, for example an alkaline salt of dichlorophen. This is usually the sodium salt although potassium, lithium or ammonium salts may be used.

It is known that such salts are very hygroscopic, their preparation difficult and also expensive. It is therefore usual practice to employ a solution of sodium dichlorophen. It is obvious that where (i) a desired concentration of active material is required in a circulatory cooling system in which coolant is continually being removed and replaced or (ii) in the case of "water bottoms" which increase in volume in storage vessels, then either a large number of additions of microbicide have to be made to adjust the concentration of the dichlorophen in the system or a wastefully high concentration of microbicide has to be used initially so that in spite of losses and makeup, the level of the biocide does not fall below the desired minimum. Alternatively, expensive mechanical metering has to be employed to maintain the concentration of microbicide. To determine whether sufficient dichlorophen has been added and maintained, either a microbiological investigation or a chemical analysis is necessary.

It is an object of the present invention to provide solid compositions, in the form of granules containing dichlorophen, an alkali and a sodium silicate. We have found that by mixing solid dichlorophen with commercial sodium carbonate and moistening the mix with commercial water-glass (sodium silicate) granules may be prepared which when placed in an aqueous environment, release dichlorophen to give aqueous solutions in which the concentration of biocide may vary between 200–5,000 p.p.m.

Such a composition, contained in a suitable dispensing container such as a wire cage or muslin bag can be suspended in a convenient part of the circulatory cooling system, or storage tank.

The dispensing container is then merely filled at extended intervals when visual inspection shows this to be necessary. Furthermore, the amount of biocide used can be determined by the difference in quantity between that used originally and that remaining.

The invention accordingly provides a method for reducing the formation of bacteria, algae and/or fungi in a water system which comprises adding water to the water system a granular composition comprising solid dichlorophen, sodium carbonate and a sodium silicate.

Thus the invention provided a bactericidal, algicidal and/or fungicidal composition in granular form made by mixing sold dichlorophen and commercial sodium carbonate with an aqueous solution of sodium silicate.

The ratio of dichlorophen may be between 10 and 60 percent by weight, the ratio of commercial sodium carbonate (soda ash) between 10 and 50 percent by weight and the ratio of sodium silicate solution between 20 percent and 60 percent (specific gravity 1.4–1.7) on the weight of the composition. By varying the ratios of the three components granules may be obtained which give varying concentrations of dichlorophen in water. By variations of drying and mixing conditions granules of various sizes can be obtained.

Following is a description by way of example of methods of carrying the invention into effect.

EXAMPLE I 4 kg. of dichlorophen technical solid and 1 kg. commercial sodium carbonate (soda ash) were mixed in a Kenwood planetary mixer running at slow speed (88 r.p.m.). 4 kg. of sodium silicate solution (sp. gr. 1.7) diluted with 1 litre of water, were then added to the dichlorophen/sodium carbonate mixture. Mixing was continued for 15 minutes and the agglomerated particles were removed and dried on trays at a temperature not exceeding 60° C. Yield 9.21 kg.

Of the granules 90 percent did not pass a 20 mesh sieve and 65 percent did not pass a ¼-inch mesh sieve.

EXAMPLE II

The method of preparation was as in example 1, but the time of the final mixing was reduced from 15 minutes to 5 minutes. Drying on trays gave granules 100 percent passing a ¼-inch mesh sieve and 80 percent being retained by a 20 mesh sieve.

EXAMPLE III

The method of preparation was as in example 1, but the mixing time was extended to 30 minutes and this produced a dough which was granulated in a Manesty oscillatory granulator. Drying on trays at a temperature not exceeding 60° C. gave firm granules 90 percent of which were between three-eighths inch and one-fourth inch in diameter.

EXAMPLE IV 5 kg. of dichlorophen and 1 kg. commercial sodium carbonate (soda ash) were mixed for 10 minutes in a Husky mixer rotating at 60 r.p.m. 10 kg. sodium silicate solution (sp. gr. 1.57) were added over 1 minute. After stirring for 2 minutes, 2 litres of water which had been used to wash out the sodium silicate container were added in a stream over 1 minute. Mixing was continued.

Drying on trays produced fine granules, but as larger ones (¼-inch diameter) were required, a further 500 mls. of water were added and while still stirred at 60 r.p.m. a plastic dough resulted. This was then fed through a Manesty oscillatory granulator fitted with a ¼-inch screen and gave a granule of ⅛"–¼" diameter, in a yield of 10.6 kgs.

EXAMPLE V 10 kg. Dichlorophen and 3 kg. of commercial sodium carbonate (soda ash) were mixed in a Husky mixer running at 60 r.p.m. for 10 minutes. 10 kg. of sodium silicate solution (sp. gr. 1.57) were added. Stirred at 60 r.p.m. for 3–6 minutes, small balls resulted. 4 litres of water was added over 2 minutes and in 2 minutes a thick dough resulted. This dough was processed through a Manesty oscillatory granulator and gave 21.4 kg. of the desired granules.

The following table shows the typical effect of varying the ratio of dichlorophen, sodium silicate and sodium carbonate

| | Ratio w./w. of ingredients | | | | Dichlorophen in water, p.p.m. |
|---|---|---|---|---|---|
| | Dichlorophen | Sodium silicate Sp. 1.57 | Sodium carbonate | Granule obtained | |
| 1 | 40 | 40 | 10 | Granules approx. 60% ⅛"–¼" diameter. | 559 |
| 2 | 40 | 35 | 15 | Soft granule | 404 |
| 3 | 40 | 30 | 20 | Friable granule | 343 | with particular reference to the concentration of the dichlorophen.

For this test 1 g. of the granule was mixed or 15 seconds in a Waring Blender with 250 mls. of water. A fraction was filtered immediately and the dichlorophen content was determined on the clear filtrate.

We claim:

1. A method for reducing the formation of bacteria, algae and fungi in an industrial water system which comprises suspending in the water system a granular composition comprising particles of solid 2,2'-dihydroxy-5,5'-dichlorodiphenylmethane and sodium carbonate bound together with sodium silicate, the composition containing said components in the following amounts by weight:

10–60 percent 2,2'-dihydroxy-5,5'-dichlorodiphenylmethane
10–50 percent sodium carbonate
20–60 percent sodium silicate (specific gravity 1.4–1.7), and the composition being placed in said water system in an amount effective to provide a concentration of about 200 to 5,000 p.p.m. of 2,2'-dihydroxy-5,5'-dichlorodiphenylmethane in the water of said system.

* * * * *

UNITED STATES PATENT OFFICE
CERTIFICATE OF CORRECTION

Patent No. 3,617,244            Dated November 2, 1971

Inventor(s) Philip P. Jones and Alexander W. Davidson

It is certified that error appears in the above-identified patent and that said Letters Patent are hereby corrected as shown below:

Page 1, Column 1, below "Assignee BDH Chemicals Limited"

insert --Priority March 28, 1968

Great Britain 14942/68 --.

Signed and sealed this 9th day of May 1972.

(SEAL)
Attest:

EDWARD M. FLETCHER, JR.              ROBERT GOTTSCHALK
Attesting Officer                    Commissioner of Patents